(12) United States Patent
Ikegami et al.

(10) Patent No.: US 7,895,976 B2
(45) Date of Patent: Mar. 1, 2011

(54) ANIMAL LITTER

(75) Inventors: Takeshi Ikegami, Tokyo (JP); Takayuki Matsuo, Tokyo (JP)

(73) Assignee: Uni-Charm Corporation, Shikokuchuo-shi (JP)

( * ) Notice: Subject to any disclaimer, the term of this patent is extended or adjusted under 35 U.S.C. 154(b) by 1415 days.

(21) Appl. No.: 11/148,420

(22) Filed: Jun. 9, 2005

(65) Prior Publication Data
US 2006/0027181 A1    Feb. 9, 2006

(30) Foreign Application Priority Data

| Jun. 10, 2004 | (JP) | ............................. 2004-173111 |
| Sep. 16, 2004 | (JP) | ............................. 2004-269503 |
| Mar. 23, 2005 | (JP) | ............................. 2005-084643 |

(51) Int. Cl.
   *A01K 29/00*    (2006.01)
(52) U.S. Cl. ..................................... 119/171
(58) Field of Classification Search ............... 119/171
   See application file for complete search history.

(56) References Cited

U.S. PATENT DOCUMENTS

| 5,207,830 | A |   | 5/1993  | Cowan et al. |          |
| 5,325,816 | A | * | 7/1994  | Pattengill et al. | 119/173 |
| 5,900,253 | A |   | 5/1999  | Ito |          |
| 6,148,768 | A | * | 11/2000 | Ochi et al. | 119/172 |
| 6,399,668 | B1| * | 6/2002  | Miyake et al. | 521/92 |
| 6,578,520 | B2| * | 6/2003  | Otsuji et al. | 119/165 |

FOREIGN PATENT DOCUMENTS

| CN | 1364407 A  |   | 8/2002  |
| CN | 1403399 A  |   | 3/2003  |
| EP | 0788736 A1 |   | 8/1997  |
| EP | 0934695 A1 |   | 8/1999  |
| JP | 63-44822   |   | 2/1988  |
| JP | 63-44823   |   | 2/1988  |
| JP | 10-113087 A|   | 5/1988  |
| JP | 10-117619 A|   | 5/1988  |
| JP | 02308736   | * | 12/1990 |
| JP | 04-099424  |   | 3/1992  |
| JP | 6-22659    |   | 2/1994  |
| JP | 6-237661   |   | 8/1994  |
| JP | 06-276875  |   | 10/1994 |
| JP | 06-284834  |   | 10/1994 |
| JP | 07133104   | * | 5/1995  |
| JP | 7-39392    |   | 7/1995  |
| JP | 07-327536  |   | 12/1995 |
| JP | 08-056519  |   | 3/1996  |
| JP | 09-023776  |   | 1/1997  |
| JP | 09023776   | * | 1/1997  |
| JP | 09-271283  |   | 10/1997 |
| JP | 09-313060  |   | 12/1997 |
| JP | 10-113087  |   | 5/1998  |
| JP | 10-229768  |   | 9/1998  |
| JP | 10-229768 A|   | 9/1998  |
| JP | 10229768   | * | 9/1998  |
| JP | 10229768 A | * | 9/1998  |
| JP | 11032608   | * | 2/1999  |
| JP | 11-127713  |   | 5/1999  |
| JP | 2000-32861 |   | 2/2000  |
| JP | 2001-204288|   | 7/2001  |
| JP | 2001-346466|   | 12/2001 |
| JP | 2002-010719|   | 1/2002  |

OTHER PUBLICATIONS

OSH Answers: Thermal Comfort for Office Work, CCOHS Your Environmental Health & Safety Partner [online]. Retrieved from the Internet <http://web.archive.org/web/20010804100010/http://ccohs.ca/oshanswers/phys_agents/ther...> [retrieved on Mar. 31, 2009], 3 pp.*
JP-07133104 Kato et al. English translation, 15 pages.*
JP-09023776 Ochi et al. English translation, 42 pages.*
JP-11032608 Sasahara English translation, 12 pages.*
JP-02308736 Morifuji English translation, pp. 1-8.*
JP-10229768 Tanaka et al English translation, pp. 1-10.*
Tanaka et el. JP 10229768 Toilet for Pets, English translation, 32 pp.*
Tanaka et al. JP 10229768 1998, English translation, 32 pp.*

(Continued)

*Primary Examiner* — June Hwu
(74) *Attorney, Agent, or Firm* — Morrison & Foerster LLP (57) ABSTRACT

A litter which has superior absorbency and deodorization capabilities, does not roll nor spread over a wide area easily, does not easily stick to the bottom of animals' feet, and is not easily carried out of the container when an animal enters or exits a container holding this litter is provided. By combining micronized resin or adhesive agent of which the main ingredient is silica sol to silica gel powder and compressing and molding, a litter which has superior absorbency and deodorization capabilities, does not roll nor spread over a wide area easily, does not easily stick to the bottom of animals' feet, and is not easily carried out of the container when an animal enters or exits a container holding this litter can be provided.

6 Claims, 7 Drawing Sheets

OTHER PUBLICATIONS

Morifuji JP-02308736 1990, English translation, pp. 1-8.*
Tanaka et al. JP-10229768 1998, English tranlation, pp. 1-10.*
Kato et al. JP-07133104 1995, English translation, 15 pp.*
Ochi et al. JP-09023776 1997, English translation, 42 pp.*
Sasahara JP-11032608 1999, English translation, 12 pp.*

European Search Report dated Aug. 3, 2007, along with Annex to the European Search Report, directed to counterpart EP Application No. 05253479.9 (3 pages).
Japanese Notice of Reasons for Rejection, mailed Mar. 16, 2010, directed to counterpart Japanese Patent Application No. 2005-084643; 3 pages (with partial English translation).

* cited by examiner

ANIMAL LITTER

CROSS-REFERENCE TO RELATED APPLICATION

This application is based upon and claims the benefits of priorities from Japanese Patent Applications No. 2004-173111 filed on Jun. 10, 2004, No. 2004-269503 filed on Sep. 16, 2004, and No. 2005-084643 filed on Mar. 23, 2005, the entire contents of which are incorporated herein by reference.

FIELD OF THE INVENTION

The present invention is related to lining material which is used to line litter containers for pets such as cats and dogs and is more particularly related to animal litter comprising a plurality of granular materials.

RELATED ART

Plastic box-shaped containers lined with granular materials called "animal litter", "cat litter", or the like are used as litter container for animals such as cats and dogs which are kept indoors. Generally, as animal litter such as this (may be hereinafter referred to simply as "litter"), bentonite and paper which can absorb fluids, zeolite which has deodorizing power, and the like which are molded into roughly spherical shapes of approximately several millimeters to several centimeters in diameter are used.

In this regard, in recent years, molded silica gel, a material superior in absorbency and deodorization of animal excretory matter, is being proposed as litter. For example, in Patent Reference 1, litter which is dried granular material obtained through mixing adhesive agent containing silica sol (colloidal silica) with silica gel powder and molding into balls by a ball-molding machine is disclosed. The litter described in this Patent Reference 1 is porous and is superior in absorbency and deodorization of animal excretory matter. Furthermore, this litter is ball-shaped, has high strength and water-resistance, does not break easily even after absorbing animal excretory matter, and can be used for long periods of time.

[Patent Reference 1] Japanese Patent Laid-Open Publication No. H9-271283

SUMMARY OF THE INVENTION

However, because the litter described in Patent Reference 1 is molded into small balls of approximately 2 mm to 6 mm in diameter for the purpose of absorbing animal urine quickly, it can easily be scattered out of its plastic container and is also prone to rolling. Therefore, litter which has been carried outside of the container, such as by sticking to the bottom of an animal's foot, is easily spread over a wide area.

The present invention has been made with the foregoing problems in mind, and its object is to provide an animal litter which is superior in absorbency and deodorization and, at the same time, does not easily roll nor spread over a wide area. In addition, the object of the present invention is to further provide an animal litter which does not easily stick to the bottom of animals' feet and is not easily carried outside of the container when the animal enters and exits the container.

The inventors of the present invention, as a result of keen research into solving the foregoing problems, discovered that these problems can be solved by molding granular material, mainly composed of silica gel, into a non-spherical form and have reached completion of the present invention. More specifically, the present invention provides the following:

(1) An animal litter comprising a plurality of granular materials wherein a maximum outer diameter of each of the granular materials is 3 mm or more and 20 mm or less, and each of the granular materials is roughly cylindrical and the centers of both end surfaces are cupped outward.

The shape of a granular material comprising the animal litter according to the present invention is preferable to be "non-spherical". Not only granular materials intentionally molded into a "non-spherical" shape, but also those which have resulted in a "non-spherical" shape are also included within the present invention. The "non-spherical" shape stated in the present invention refers to a shape wherein, when a flat board onto which litter is placed is moved in an arbitrary direction, the litter does not roll in the arbitrary direction. By forming the shape of the granular material into a "non-spherical", animal litter which does not easily roll nor spread over a wide area can be provided.

Although the size of the granular material is not particularly limited, the preferred maximum outer diameter is 3 mm or more and 20 mm or less, and further preferred is 6 mm or more and 10 mm or less. Because the spaces between the granular materials are large if the maximum outer diameter is approximately 10 mm, it is especially preferable because animal urine passes through these crevices and quickly moves to the absorbent sheet placed under the granular materials. In addition, it does not easily stick to the bottom of the animal's feet, and the risk of carrying the granular materials outside of the container when the animal enters and exits the container holding the granular materials can be reduced. On the other hand, if the granular material is too small, the spaces between the granular materials are small, liquid passing is reduced, and the longevity of the litter is shortened. The preferred thickness of a mass of the granular materials is 5 mm or more and 12 mm or less and further preferred is 5 mm or more and 9 mm or less.

Although the specific shape of the granular material is not particularly limited, it is preferable that the shape of the granular material is one which does not have many corners, in order to prevent the granular materials from grinding together, wearing, and generating dust. Particular examples are: multangular column-shapes wherein the sectional sides are triangular, quadrangular, star-shaped, donut-shaped, rhombus-shaped, hexagonal or the like; polyhedron-shapes such as quadrihedron and orthohexahedron; shapes such as these wherein the corners have been removed; roughly cylindrical-shapes; center-protrusion shapes wherein the centers of both end surfaces of a rough cylinder are cupped outward; and center-depression shapes wherein the centers of both end surfaces of a rough cylinder are depressed. If the center is a flat surface, the flat surfaces of the granular materials adhere to each other and liquid passing becomes poor. In addition, if the center is depressed, fluid pools in the depressed area and liquid passing becomes poor. Therefore, it is preferable that the granular material has a center-protrusion shape wherein the centers of both end surfaces of a rough cylinder are cupped outward.

(2) The animal litter according to (1) wherein a mass of the granular materials has a liquid absorptive property whereby the mass absorbs in three second from 20% or more to 70% or less of a maximum absorbable amount of liquid that can be absorbed by the mass, and the maximum absorbable amount of liquid is from 0.3 times or more to 4.0 times or less the weight of the mass.

Each of the granular materials comprising litter has a reduced absorption rate. Therefore, fluid first quickly weaves through the crevices between the granular materials. Then, the fluid remaining on the surfaces of the granular materials is absorbed into the granular materials with time. Therefore, it is difficult for moisture to remain on the surface of the granular materials, and a dry state can be maintained easily.

"Absorbable amount of liquid per three seconds" is, for example, the value measured by the procedures 1) to 5) below.

Figure 11:
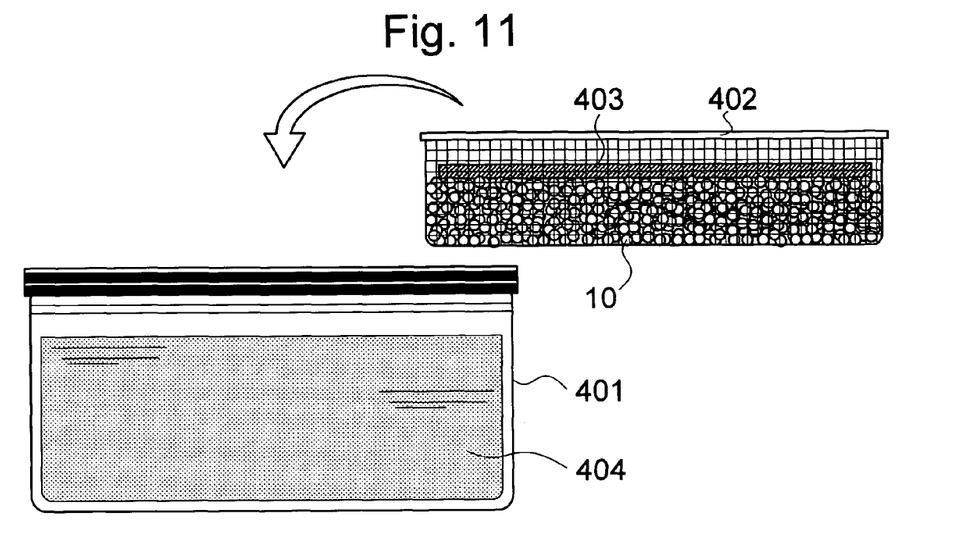
FIG. 11 is a diagram showing the measurement method for absorbable amount of liquid.

1) As shown in FIG. 11, 100 g of granular materials 10 is measured out and placed inside a draining container 402 (for example, a drainer) and pressed from above by a board 403 (for example, stainless steel board) which acts as a weight;

2) The entire draining container 402 is immersed in a water tank 401, which is filled with saline solution 404, for three seconds to a depth wherein the granular materials 10 is completely immersed;

3) The draining container 402 is removed from the water, the board 403 is removed, the granular materials is sandwiched between a sufficient amount of paper towels (towels with a water retention rate of four times or more is used; the towel must immediately absorb water dropped from a dropper without pooling; for example, preferably used is KIMWIPES: registered trademark, product of Crecia Corporation) and excess water drops on the surface are removed;

4) The granular materials are again transferred to a fresh paper towel and water drops are removed (when performing a three-second measurement, water drops must be wiped away quickly because measurement errors occur due to absorption of water drops remaining on the surfaces; measurement time is as shown in Table 1);

5) Weight after wiping minus 100 g is the absorbable amount of liquid per 100 g of granular materials.

In addition, "maximum absorbable amount of liquid" refers to "the absorbable amount of liquid per ten minutes" and is determined by the same procedures other than changing "three seconds" to "ten minutes".

TABLE 1

| | Time required | Time elapsed from start of measurement |
|---|---|---|
| Immerse in water tank | 3.0 seconds | 3.0 seconds |
| Remove and place contents onto Kimu Towel | for 2.0 seconds | 5.0 seconds |
| Cover with Kimu Towel and wipe away excess moisture | for 3.0 seconds | 8.0 seconds |
| Transfer once again to a fresh Kimu Towel | for 5.0 seconds | 13 seconds |
| Wipe away water drops | for 10 seconds | 23 seconds |

(3) The animal litter according to (1) or (2) wherein the granular materials has a liquid passing ratio of 60% or more.

The liquid passing rate of conventional litter is: (a) 27% for clumping-type paper litter (composed of pulp, high-absorbency resin, and starch), (b) 50% for non-clumping-type (composed of pulp and calcium carbonate), (c) 7% for water-resistant silica gel with an initial water content of 5% and particle diameter of 3 mm to 3.5 mm. In contrast, in the present invention, the liquid passing rate of the mass of the granular materials is 60% or more, and therefore, liquid can pass through the crevices between the granular materials easily, and in particular, it is effective when used in combination with an absorbent sheet. Further a liquid passing rate of the mass of the granular materials comprising the litter in the present invention of 70% or more is more preferable, and still further preferable is that of 80% or more.

[Test Method for Liquid Passing Rate]

"Liquid passing rate" in the present specification is, for example, the values measured in procedures 1) to 6), described below.

Figure 12:
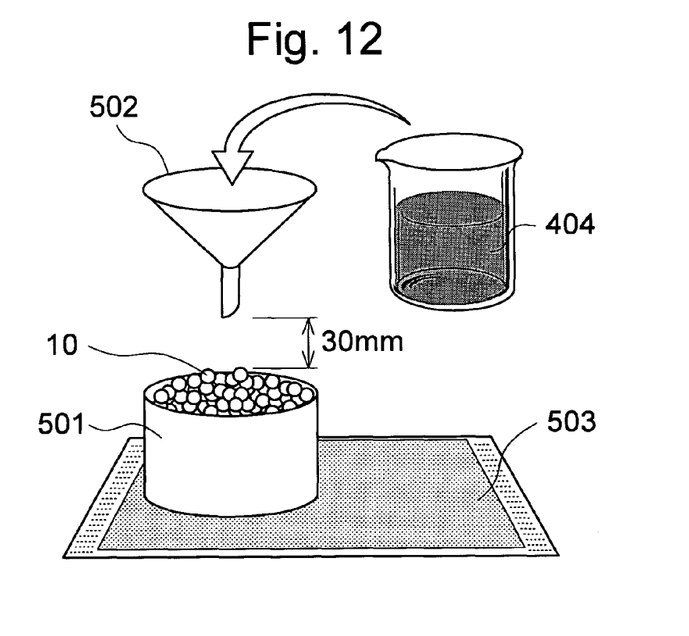
FIG. 12 is a diagram showing the measurement method for liquid passing.

1) As shown in FIG. 12, a weight A of a pet toilet sheet 503 (preferably having properties described hereafter; for example, "DEO-SHEET": registered trademark, product of Uni-Charm Petcare Corporation is used preferably) is measured;

2) A cylinder 501 (for example, a cylinder with a diameter of 75 mm and a depth of 30 mm is prepared to fill granular materials 10 to a depth of 30 mm) is filled to the top with the granular materials 10 and leveled;

3) 20.0 g of saline solution 404 is dripped with a funnel 502 from a position 30 mm above the vicinity of the center of the granular materials 10 in 10 seconds;

4) After dripping, the granular materials 10 and the cylinder 501 are removed (when removing, place a plastic board over the top of the cylinder and invert the cylinder and the pet toilet sheet so that unnecessary moisture transfer between the granular materials 10 and the pet toilet sheet 503 does not occur, and then remove the granular materials 10 and the cylinder 501);

5) Weight B of the pet toilet sheet 503 is measured;

6) $100\times(B-A)/20$ = liquid passing rate

Figure 13:
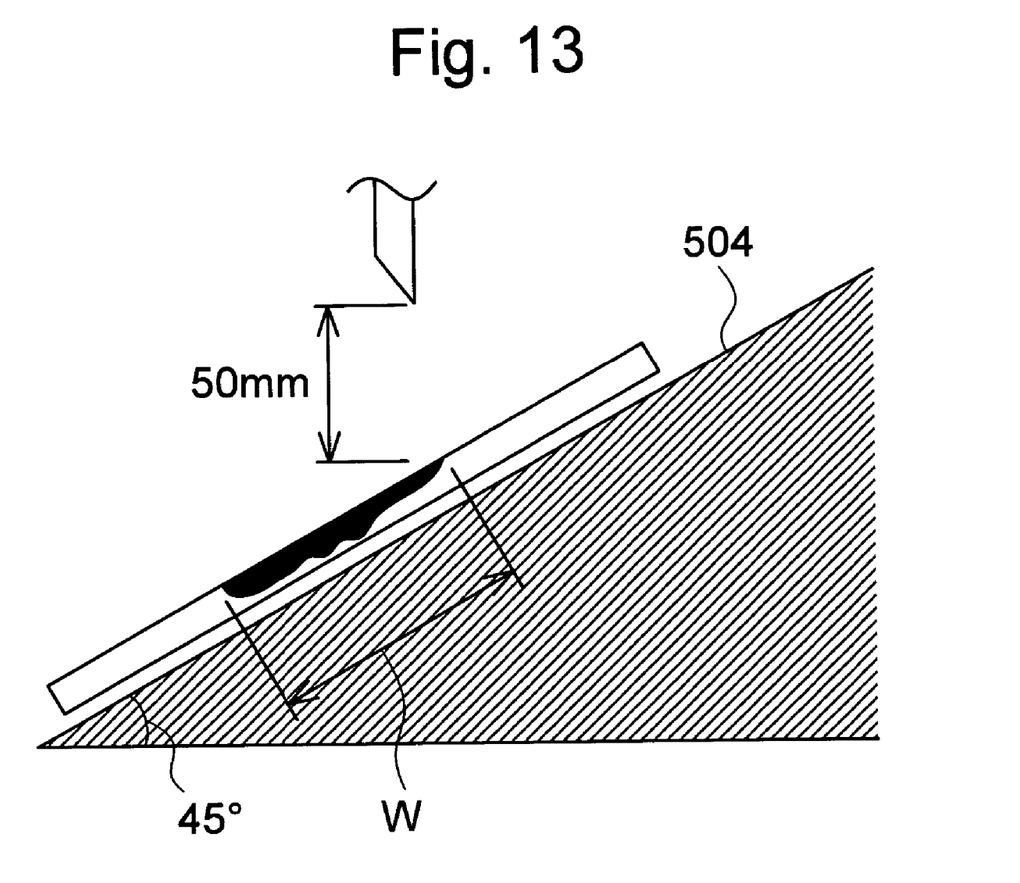
FIG. 13 is a diagram showing the measurement method for water retention amount in selection of pet toilet sheets.

As shown in FIG. 13, it is preferable to use a pet toilet sheet 503 wherein, the length w of 5 ml of saline solution flowing on it is no longer than 100 mm, when the sheet is placed along a slope 504 at a 45 degree angle and the 5 ml of saline solution is dripped from a height of 5 cm in one second on the sheet. In addition, it is preferable to use a sheet product having a water retention value of 200 g or more assuming that the sheet product has a size of 45 cm×34 cm, when the water retention value is figured by subtracting its weight before dehydration for 90 seconds by a hydro-extractor (90G) from its weight after the dehydration wherein the sheet product has been soaked in saline solution for ten minutes, then pulled out, hung to drain off the water before it is to be dehydrated.

Because litter is conventionally used with a pet toilet sheet laid beneath a draining board which holds the litter, the foregoing liquid passing rate can be measured by using a draining board filled with 30 mm of the litter, wherein the draining board is created so that fluid draining is most ideal according to the size of the granular materials.

(4) The animal litter according to any one of (1) to (3), wherein a mass of the granular materials has a water content of from 3% or more to 15% or less by weight after it has been left in an atmosphere at a temperature of 25° C. and a humidity of 50% for 24 hours.

By maintaining the initial water content of said granular materials at 3% by weight or more to 15% by weight or less or preferably 4% by weight or more to 10% by weight or less, the granular materials can pass fluid quickly and absorb moisture remaining on the granular materials. Through this, the surfaces of the granular materials can be easily maintained in a dry state and the litter can be used repeatedly for a long period of time.

(5) The animal litter according to any one of (1) to (4), wherein each of the granular materials is made by compressing and molding a mixture of silica gel powder and adhesive agent the main ingredient of which is silica sol Silica gel (A-type, B-type, or C-type), bentonite, kaolin and zeolite, natural fibers such as ground wood meal and ground pulp and the like can be used as the main ingredient of the granular materials. Especially preferable are fluid-saturated mineral substances which release moisture under natural room conditions (at a temperature of 25° C., a humidity of 50%): B-type silica gel; C-type silica gel; zeolite; wood meal; and pulp meal are exemplified. This is because, based on the characteristic of being used in combination with pet toilet sheets, it is better if the material can release fluid which had been once absorbed and can be reused, in order to use the litter for a long period of time.

Among these, it is preferable that the granular material is a compressed and molded mixture of silica gel powder and adhesive agent of which the main ingredient is silica sol. Through this, litter which has high-strength even in a non-spherical shape can be obtained. In addition, because silica gel is being used, the litter is superior in absorbency, deodorization, and liquid passing. Litter which has been compressed and molded into a non-spherical shape in this way has a more consistent shape in comparison with litter which has been formed through rolling the mixture, and permeation and absorbency capabilities of animal excretory matter is stable. Litter such as this which is a compressed and molded mixture of silica gel powder and adhesive agent of which the main ingredient is silica sol has absorbency equal to water-resistant silica gel (FNG silica gel) and does not break even when water is absorbed. Therefore, litter according to the present invention is especially effective when used in combination with absorbent sheets.

(6) The animal litter according to (5), wherein the mixture further comprises fibrous substance with a fiber length of from 20 μm or more to 500 μm or less.

Although the use of fibrous substances is not essential, when fibrous substance is combined to the granular material the shape of litter can be maintained and its strength enhanced because the fibrous substance acts as a binder. Furthermore, the fracture rate when removing the granular material from the compressing/molding machine can be significantly reduced. In this regard, although hot-melt-type adhesive can be combined to the silica-gel powder in place of the fibrous substance, if the amount of hot-melt-type adhesive added is too little, its function as an adhesive cannot be exerted and if the amount added is too much, absorbency of the litter is reduced. In contrast, because fibrous substances have liquid absorbency, absorbency of the litter can be adjusted by adjusting the mixture percentage of the fibrous substance. However, the use of fibrous substance also reduces liquid passing, and therefore, mixture percentage of the fibrous substance must be adjusted taking into consideration the balance between absorbency and liquid passing.

The preferred length of the fibrous substance is 20 μm or more and 500 μm or less, and further preferred is 50 μm or more and 150 μm or less. If the length of the fiber is too long, it becomes difficult to mix evenly with the silica gel powder and incurs reduction in the shape-maintaining ability of the lifter. As more specific examples of the fibrous substance, aside from pulp, there are substances such as polypropylene (PP) fiber, polyethylene terephtalate (PET) fiber and rayon. For example, particularly preferred for use is pulp having 100 mesh pass 95% length, or in other words, that of which 95% or more passes through a sieve with a hole diameter of 0.15 mm. Furthermore, the mixture percentage of these fibrous substances is 1% by weight or more to 10% by weight or less, or more preferably, 2% by weight or more to 5% by weight or more to silica gel powder.

(7) The animal lifter according to any one of (1) to (6), wherein each of the granular materials is made by compressing and molding a mixture of silica gel powder and micronized resin.

In addition, the granular material according to the present invention can be produced by compressing and molding a mixture of silica gel powder and micronized resin. In this case, micronized resin takes on the role of adhesive to bond silica gel powder particles. As silica gel powders, as in the instance above using silica sol, B-type or C-type silica gel can be used, the preferred particle diameter is 20 μm or more to 500 μm or less and further preferred is 40 μm or more to 150 μm or less. As micronized resin, aside from acrylic resin, polyethylene resin, polypropylene resin, EVA resin (ethylene vinyl acetate copolymer), vinyl acetate, polyvinyl alcohol resin and the like are exemplified. The preferred average particle diameter of these micronized resins is 0.1 μm or more to 500 μm or less, and further preferable is 0.5 μm or more to 250 μm or less, and still further preferable is 0.5 μm or more to 10 μm or less. The smaller the particle diameter, the more sufficiently stretched it is during pressurization by tableting machine or briquette method, and the easier it is to bind the micronized resins adjacent one another and increase adhesive area. Therefore, it is superior in grain moldability. The preferred mixture percentage of micronized resin to silica gel powder is 1% by weight or more to 40% by weight or less, and further preferred is 2% by weight or more and 10% by weight or less.

(8) The animal litter according to any one of (1) to (7), wherein a mass of the granular material has a dimension density of 0.3 g/cm$^3$ or more to 1.0 g/cm$^3$ or less.

The dimension density of a mass of the granular materials is preferably 0.3 g/cm$^3$ or more to 1.0 g/cm$^3$ or less, and more preferably 0.6 g/cm$^3$ or more to 0.8 g/cm$^3$ or less. If the dimension density of the mass of the granular materials is too large, not only is it inconvenient when bringing the litter home from purchase, the weight of waste after using increases. Furthermore, because the mass of the granular material itself is too dense, fluid absorbency is lost. On the other hand, if the dimension density is too small, it scatters easily.

(9) The animal litter according to any one of (1) to (8) which is placed on an absorbent sheet which absorbs the bodily fluids of an animal.

Features such as superior absorbency, deodorization, and liquid passing of the litter according to the present invention are significantly enhanced when used by placing on an absorbent sheet which absorbs bodily fluids from animals via a draining board in an exclusive litter container with a draining board. Specifically, while the urine excreted from an animal passes through the crevices between the granular materials and moves quickly to the pet toilet sheet, urine which remains on the surfaces of the granular materials is quickly absorbed. Therefore, the generation of foul odor can be effectively prevented and the interior of the litter container can be kept clean.

(10) A manufacturing method for animal litter compring a plurality of granular materials comprising: a blending process for creating a mixture by blending adhesive agent the main ingredient of which is micronized resin or silica sol with silica gel powder, and a molding process to form non-spherical granular materials.

In the blending process wherein the adhesive agent of which the main ingredient is micronized resin or silica sol is blended with silica gel powder, it is necessary to add the micronized resin or adhesive agent into the silica gel powder in small amounts and sufficiently stir the mixture so that the silica gel powder does not harden in parts and form lumps. Preferably, the mixture of silica gel powder and micronized resin or adhesive agent is stored in an airtight container to prevent the evaporation of moisture and cured by leaving the mixture sitting for about 24 hours. By curing, the micronized resin or silica sol mixes sufficiently with the silica gel powder, and the strength of the litter can be enhanced. In addition, compression and molding is performed using a briquette-method compressing/molding machine or a tableting machine and the mixture of silica gel powder and micronized resin or adhesive agent is molded into an arbitrary shape such as a rough cylinder by applying pressure of approximately 10 KN/cm² to 30 KN/cm².

The average particle size of the ingredients comprising the foregoing granular material is preferably 1 to 1000 μm, more preferably 20 to 500 μm, and still more preferably 40 to 150 μm. If the particle size is large and exceeds 1000 μm, the adhesive surface of a binder such as resin, explained hereafter, becomes relatively small under the same weight, and sufficient adhesion cannot be attained. In addition, if the particle size is small and is below 1 μm, the flowability is lost and productivity falls. In particular, if the granular material is manufactured by a tableting machine, explained hereafter, it is important to provide a consistent amount, but if the granular material has poor flowability and large repose angle, a bridge occurs and a decrease in productivity becomes a problem. In order to facilitate the removal of pestle 15 and 15a from mortar 16 and 16a, magnesium stearate or the like which acts as lubricant agent can be added. By adding lubricant, the dropping of the granular material from the pestle when molding with the tableting machine is improved, and consistent molding of grains and a lightening effect on the load on machinery is attained.

(11) An animal litter box comprising an animal litter container comprising an opening enabling an animal to enter and exit, a floor part having a liquid passing property wherein an animal litter is spread, and an absorbent sheet holder which is positioned beneath the floor part of the animal litter container and onto which an absorbent sheet is placed wherein the animal litter is the animal litter according to any one of (1) to (9).

The animal litter box of the present invention is constructed of a two-layer structure comprising a container for storing an animal litter and a holder onto which an absorbent sheet is placed. Therefore, fluid contained in the excretory waste excreted from an animal can be transferred quickly to the absorbent sheet. In addition, by separating the floor part of the animal litter container from the absorbent sheet within the absorbent sheet holder, the return of the fluid transferred to the absorbent sheet to the animal litter can be prevented.

According to the present invention, an animal litter which does not roll easily, and at the same time, is superior in strength and can be used for a long period of time can be obtained. In addition, an animal litter which is superior in absorbency and deodorization of excretory wastes from animals such as urine, quickly transfers urine to a pet toilet sheet placed beneath the litter, and prevents the generation of foul odors can be obtained.

DESCRIPTION OF THE PREFERRED EMBODIMENT

The present invention is described below, with reference to the drawings.

First Embodiment

Shape

Figure 1:
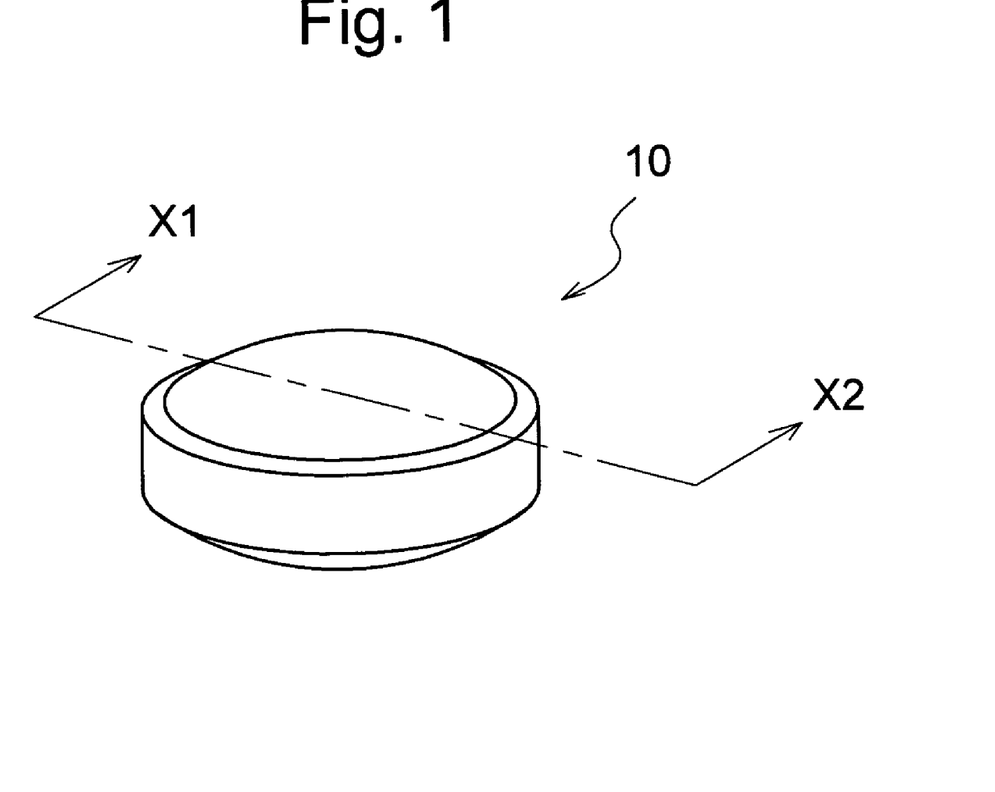
FIG. 1 is a perspective view of a granular material 10 comprising a litter according to a first embodiment.
Figure 2:
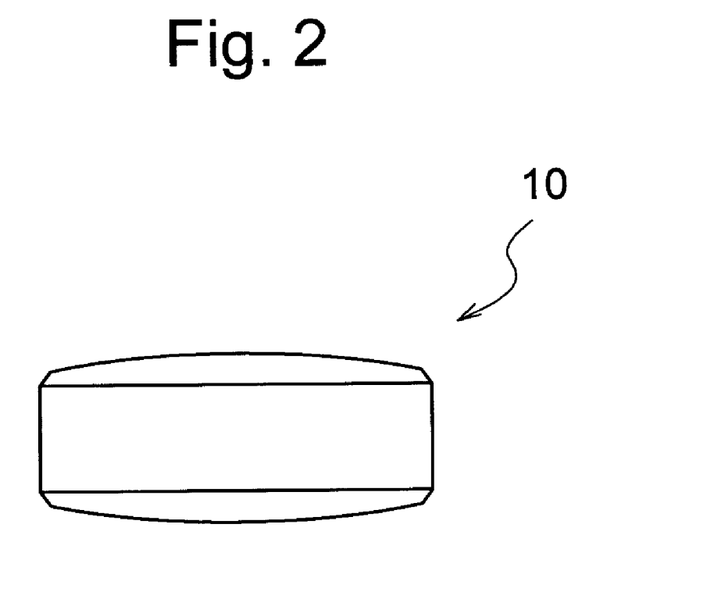
FIG. 2 is a cross-sectional view of the granular material 10 in FIG. 1 cut in the direction of X1 to X2.

A perspective view of a granular material 10 which composes litter according to a first embodiment is shown in FIG. 1. A cross-sectional view of the granular material in FIG. 1 when cut in the direction of X1 to X2 is shown in FIG. 2. As shown in FIG. 1 and FIG. 2, the granular material 10 which composes litter according to the first embodiment has a rough cylindrical shape. The maximum outer diameter of this granular material is 10 mm and its thickness is 7 mm. In addition, the center of the end surfaces are cupped outward and the curvature radius is 10 mm.

[Manufacturing Method]

The manufacturing method for the granular material 10 which composes litter according to the first embodiment comprises a blending process and a molding process. The details are as follows:

[Blending Process]

First, after mixing pulp with short fiber length in the amount of 5 weight part of to B-type or C-type silica gel powder, in the amount of 50 weight part of, adhesive agent of which the main ingredient is silica sol, is added in the amount of 45 weight part to the mixture gradually and is sufficiently stirred so that large lumps are not formed. The mixture stirred sufficiently is placed in a container so that moisture does not evaporate and is left to sit for one day to enable the adhesive to be mixed.

[Molding Process]

Figure 3:
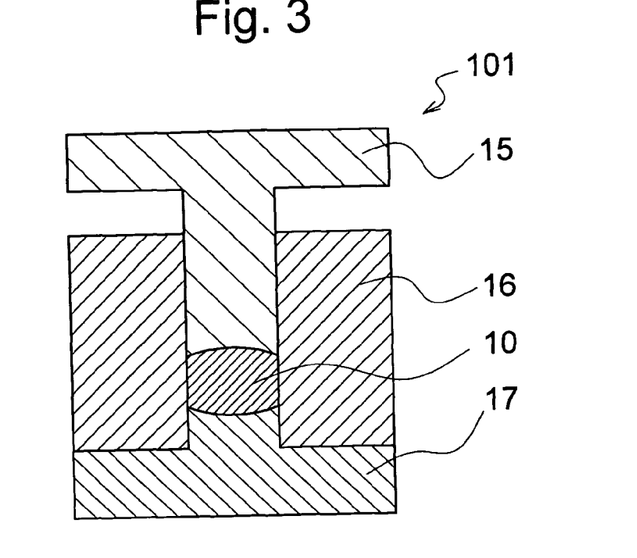
FIG. 3 is a general block diagram of a hand press machine which is a manufacturing device for litter according to the present invention.

After the mixture has sat for one day, it is formed in to a rough cylindrical-shape by applying pressure, such as by using a hand press machine 101 shown in FIG. 3. More specifically, after the mixture is placed within mortar 16, pressure is applied to pestle 15, and the mixture is compressed and molded. After compression and molding, the molded material is removed from the hand press 101 and dried until its water content is 10% or lower of its weight. Lastly, it is sifted, powder and fragmented materials are eliminated, and the roughly cylindrical granular material 10 is obtained. The pressure applied when compressing and molding is adjusted accordingly taking into consideration the removability from the molding machine, and the strength and dryness of the granular material. If pressure is too strong, the absorbency of urine and the like is lost, and on the other hand, if it is too weak, it becomes difficult for the granular material to maintain its shape. In particular, if a hand press machine which is of a size appropriate for obtaining granular material with a maximum outer diameter of 10 mm, or in other words, when using a hand press machine of which the inner diameter of the pestle 15 is 10 mm, the desired rough cylindrical-shape can be obtained by applying a pressure of 10 KN/cm$^2$ to 30 KN/cm$^2$.

Second Embodiment

Figure 4:
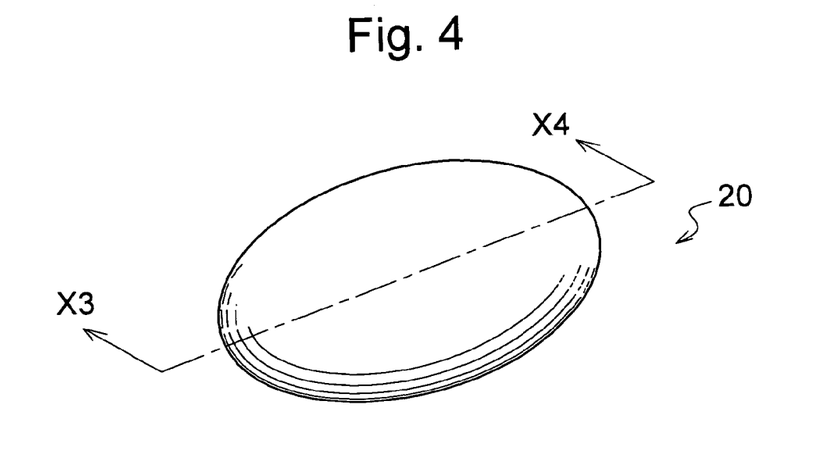
FIG. 4 is a perspective view of a granular material 20 which comprises a litter according to a second embodiment.
Figure 5:
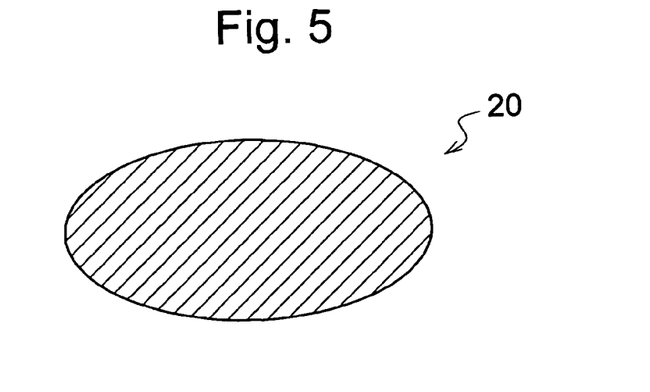
FIG. 5 is a cross-sectional view of the granular material 20 in FIG. 4 cut in the direction of X3 to X4.

A perspective view of a granular material 20 which composes litter according to a second embodiment is shown in FIG. 4. A cross-sectional view of the granular material 20 in FIG. 4 when cut in the direction of X3 to X4 is shown in FIG. 5. As shown in FIG. 4 and FIG. 5, the granular material 20 which composes litter according to the second embodiment has a rough almond shape. The maximum outer diameter of this granular material 20 is 10 mm and its thickness is 7 mm. Because the granular material 20 composing the litter of the second embodiment does not have any edge parts, it does not easily wear and is superior in strength.

[Manufacturing Method]

As in the first embodiment, the manufacturing method for granular material 20 which composes litter according to the second embodiment comprises a blending process and a molding process. The details are as follows:

[Blending Process]

First, micronized resin such as micronized acrylic resin of a weight ratio of from 2% to 10% is mixed with B-type or C-type silica gel powder. The mixture percentage of the silica gel powder and the micronized resin is adjusted accordingly taking into consideration the removability from the molding machine, and the strength and dryness of the granular material when the mixture is compressed and molded.

[Molding Process]

Figure 6:
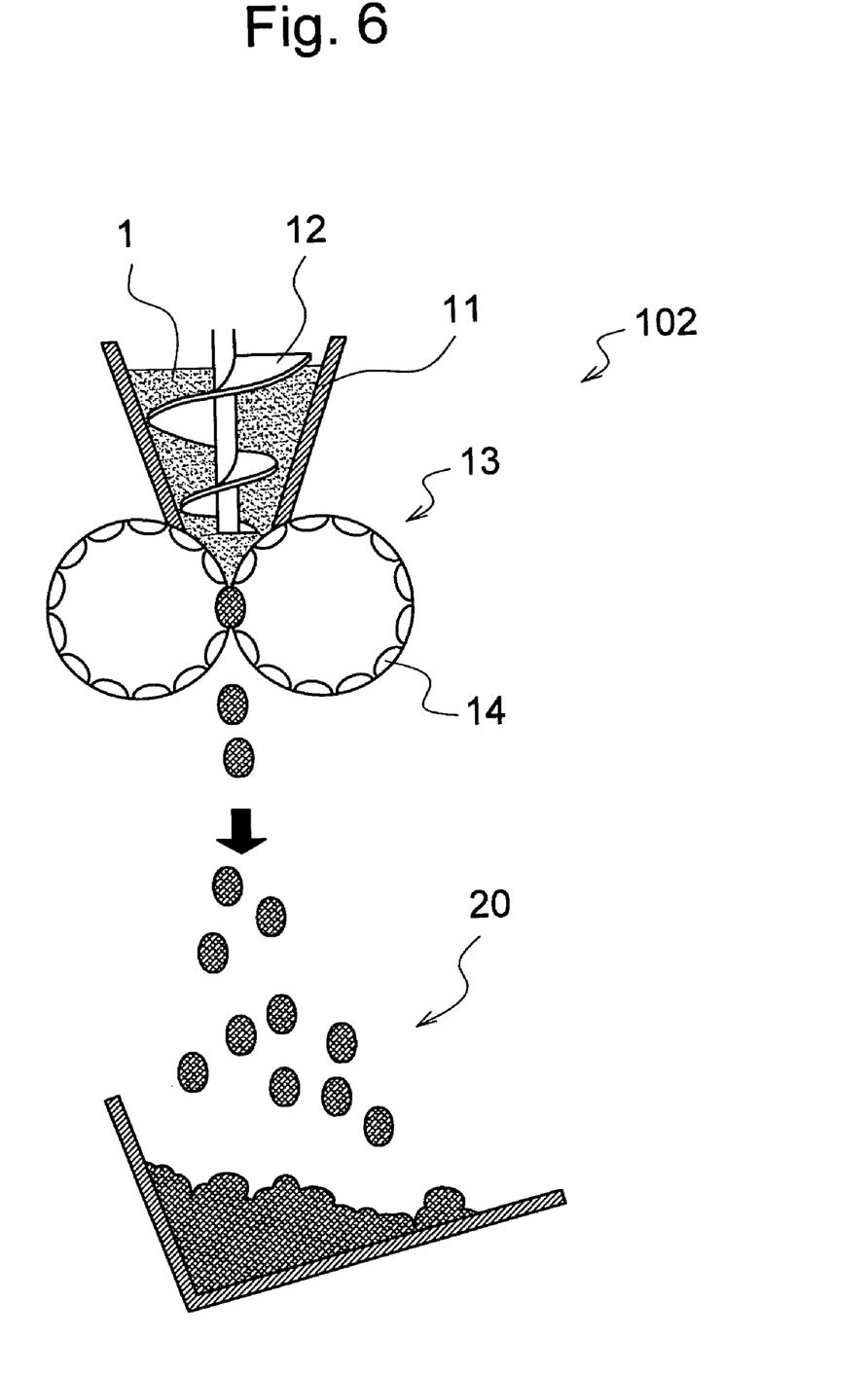
FIG. 6 is a general block diagram of a briquette-method compressing and molding machine which is a manufacturing device for litter according to the present invention.

The rough almond shape is formed using a briquette-method compressing/molding machine (Briquetting machine manufactured by HOSOKAWA BEPEX) 102. Specifically, the mixture 1 is fed to a hopper 11, then fed between two rotating rollers 13 while performing deaeration and preliminary compression, and compressed and molded by a pocket 14 which is the master mold constructed on the surface of the roller 13. After compression and molding, the molded material is removed from the compressing/molding machine and sifted. Powder and fragmented materials are eliminated, and the rough almond-shaped granular material 20 is obtained.

In molding of a granular material such as this which does not use water, granular material such as that which is roughly cylindrical can be manufactured using the afore-mentioned hand press machine. Specifically, it can be created by adding micronized acrylic resin of a weight ratio of 10% to B-type or C-type silica gel powder, sufficiently mixing, applying pressure by hand press machine, and compressing and molding. More specifically, if a hand press machine which is of a size appropriate for obtaining a granular material with a maximum outer diameter of 10 mm, or in other words, when using a hand press machine of which the inner diameter of the pestle 15 is 10 mm, the desired rough cylindrical-shape can be obtained by applying a pressure of 15 KN/cm$^2$.

APPLICATION EXAMPLES

Figure 7:
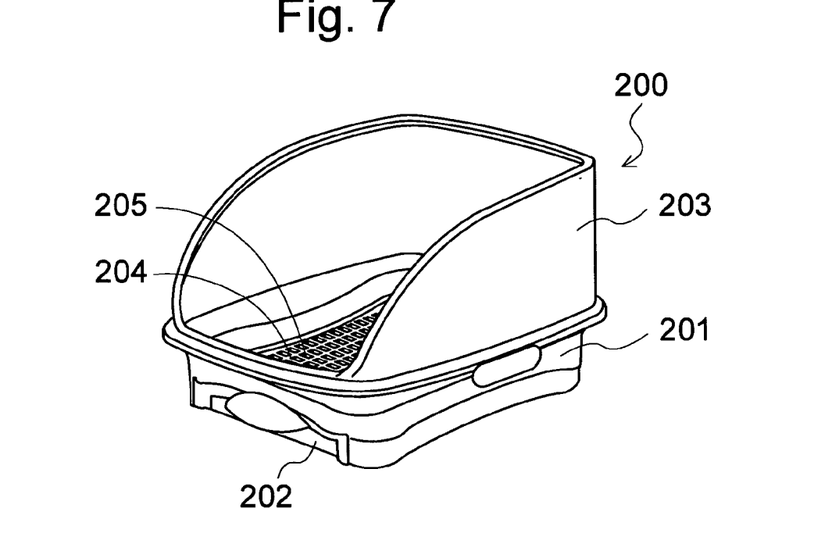
FIG. 7 is a diagram showing an embodiment of the animal litter box of the present invention.
Figure 8:
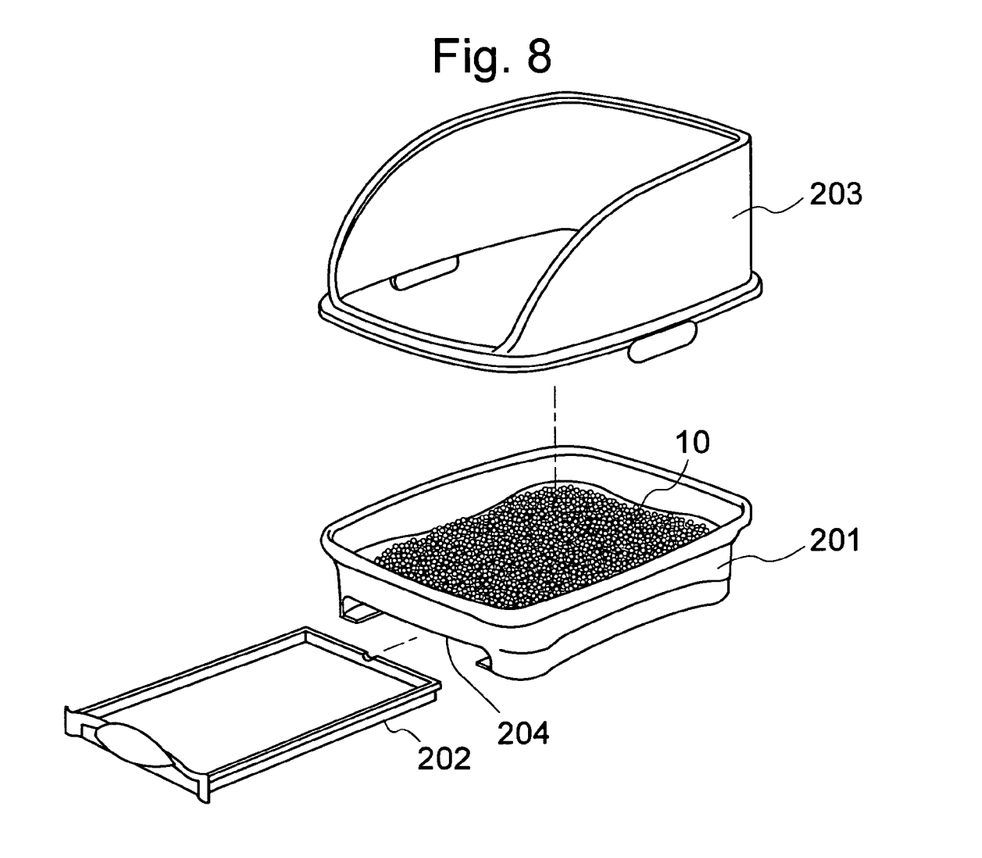
FIG. 8 is an analytical perspective view showing the usage method of the animal litter box in FIG. 7.
Figure 9:
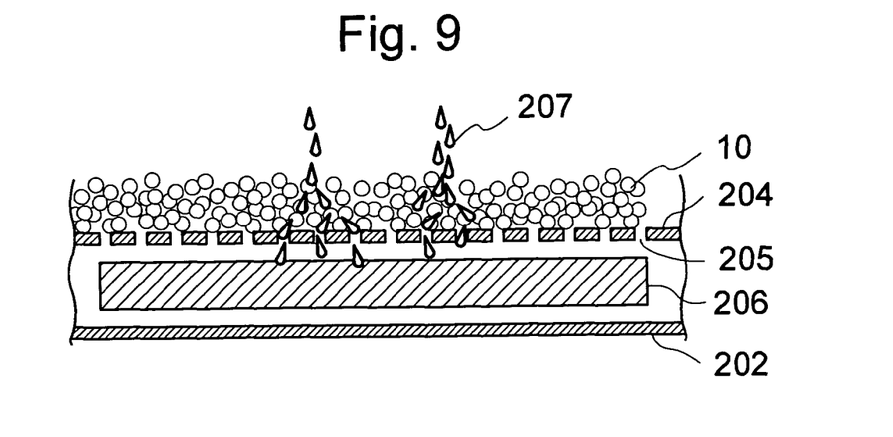
FIG. 9 is a partial cross-sectional view of the animal litter box in FIG. 7.

A perspective view of an animal lifter box using the granular materials of the first or second embodiment is shown in FIG. 7, an analytical perspective view of the method for use is shown in FIG. 8, and a partial cross-sectional view of the animal lifter box in FIG. 7 into which lifter 10 and absorbent sheet 206 is stored is shown in FIG. 9.

The animal lifter box of the present invention is mainly constructed from, as shown in FIG. 7, a box-shaped animal lifter container 201 for storing lifter which is composed of a plurality of granular materials, an absorbent sheet holder 202 for storing an absorbent sheet which is assembled beneath the animal lifter container 201 so that it can be taking in and out, and a side cover 203 which is placed in the upper area of the animal lifter container box 201 so as to cover the sides. The floor part 204 of the animal lifter container 201 has a plurality of holes 205. These holes 205 are preferably polyhedral or circular and of a size wherein the granular materials comprising the lifter 10 does not fall through.

As shown in FIG. 8, on the upper surface of the floor part 204 of the animal lifter container 201, a certain amount of the granular materials comprising the lifter 10 is spread in a layer. In addition, absorbent sheet 206 is laid within the absorbent sheet holder 202.

FIG. 9 shows a cross-section of the animal lifter box of the present invention which stores the litter 10 and the absorbent sheet 206. When the animal excretes, fluid 207 first passes through the holes 205 in the floor part 204 of the animal litter container 201 by passing between the granular materials comprising the litter 10, and is absorbed by the absorbent sheet 206 placed within the absorbent sheet holder 202. Then fluid 207 remaining on the litter 10 is absorbed into the litter 10 with the passing of time.

Example

First, a mixture of 92.5% C-type silica gel powder, 7.0% EVA (ethylene vinyl acetate copolymer resin (average volume particle diameter is 4.3μ, Japan NSC Corporation FX2350), 0.5% magnesium stearate by mass percentage was stirred and blended until the ingredients had been mixed evenly. C-type silica gel with a particle size distribution volume average particle diameter of 25 μm was used. The particle diameter of C-type silica gel powder and EVA resin was measured using Nikkiso Co., Ltd. Microtrack particle size analyzer: HRA (X-100).

Next, the mixture above was tableted using a tableting machine (Hata Iron Works Co., Ltd., Tableting machine: Type HT-T18). The same manufacturing is possible by using Kikusui Seisakusho Ltd., Tableting machine: Type VIRGO 0518SS, as well.

Figure 10:
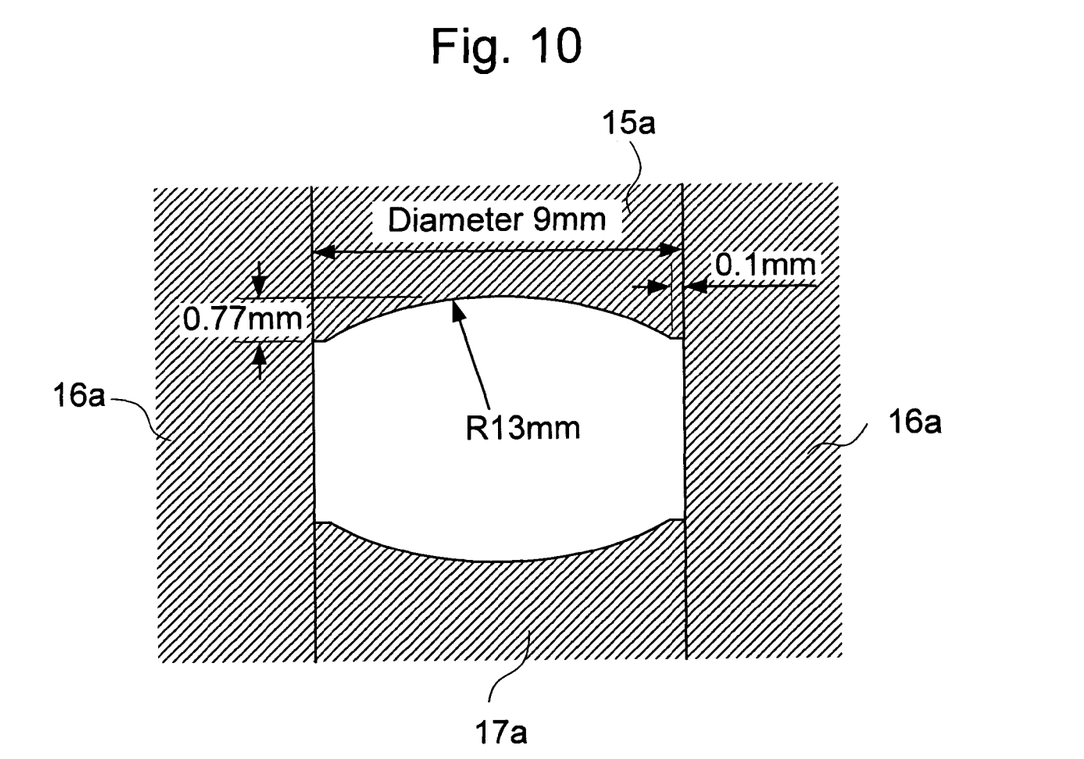
FIG. 10 is a diagram showing the shape if the mold for the tableting machine in the example.

The mold of the tableting machine used was, as shown in FIG. 10, one which comprised mortar 16*a* which has a hollow cylindrical part and pestles 15*a* and 17*a* capable of sliding up and down within this hollow, so that it can creat a center-protrusion shape wherein the center of both end surfaces of a cylinder is cupped outward. The diameter of the cylinder part of the mold is 9 mm, the R of the center protrusion is 13 mm, the flat part of the circumference of the protrusion part is 0.1 mm, and the height of the center protrusion is 0.77 mm. Furthermore, the manufacturing conditions were to feed 0.26 to 0.30 g of mixture per grain, and pressure was applied to 20 to 35 KN.

As a result, the center-protruding type granular material 10 as shown in FIGS. 1 and 2 was created. A plurality of the granular materials were created and the shape of each of the granular materials is the maximum outer diameter is 9 mm, its thickness is 5.7 mm or more to 6.0 mm or less and its weight is 0.26 to 0.30 g.

The granular materials were divided into 3 masses of about 100 g of the granular materials. The performance of each of the masses composed of the granular materials attained in this example is as shown in Table 2. The maximum liquid absorbency rate is a ratio of the maximum absorbable amount of liquid to the weight of the mass of the granular materials in Table 2. And the liquid absorbency rate per three second is a ratio of the absorbable amount of liquid per three second to the weight of the mass of the granular materials. "3 second/maximum liquid absorbency rate" is calculated from the maximum liquid absorbency rate and the liquid absorbency rate per three second and means the liquid absorptive property of the mass of the granular materials showing the ratio of the amount of liquid per three second to the maximum absorbable amount of liquid.

TABLE 2

|  | Mass 1 | Mass 2 | Mass 3 | Average |
|---|---|---|---|---|
| Maximum liquid absorbency rate | 72.4% | 71.2% | 70.8% | 71.5% |
| Liquid absorbency rate per 3 seconds | 43.7% | 44.1% | 45.4% | 44.4% |
| 3 second/maximum liquid absorbency rate | 60.4% | 61.9% | 64.1% | 62.1% |
| Liquid passing rate | 72.5% | 74.0% | 73.0% | 73.2% |

What is claimed is:

1. An animal litter comprising a plurality of granular materials wherein each of the granular materials is made by compressing and molding a mixture of silica gel powder and micronized resin, a maximum outer diameter of each of the granular materials is 3 mm to 20 mm, and each of the granular materials is substantially cylindrical shape having a top face, a bottom face and a side face, wherein the top face and the bottom face each comprise a central portion that is cupped outward, and wherein the outer edge of each of the top face and the bottom face comprises a flat portion that borders the cupped portion,
  wherein a mass of the granular materials has a liquid absorptive property so as to reduce rate of absorption, whereby the mass absorbs in three seconds 20% to 70% of a maximum absorbable amount of liquid that can be absorbed by the mass, and the maximum absorbable amount of liquid is 0.3 times to 4.0 times the weight of the mass, wherein the amount of liquid absorbed by the mass is measured according to the following steps:
  a) a 100g of granular materials is measured out and placed inside a draining container and pressed from above by a board which acts as a weight;
  b) the entire draining container is immersed in a water tank, which is filled with saline solution, for a predetermined time to a depth, wherein the granular materials are completely immersed, wherein the predetermined time is three seconds for measuring the mass absorbs in three seconds and, wherein the predetermined time is ten minutes for measuring the maximum absorbable amount of liquid;
  c) the draining container is removed from the water, the board is removed, the granular materials are transferred onto a layer paper towels, and then the granular materials are sandwiched between layers of paper towels, and excess water drops on the surface are removed for a period of three seconds;
  d) the granular materials are again transferred to a fresh paper towel, and water drops are removed for a period of ten seconds; and
  e) weight after wiping minus 100 g is the absorbable amount of liquid per 100 g of granular materials.

2. The animal litter according to claim 1, wherein a mixture percentage of the micronized resin to the silica gel powder in each of the granular materials is 1% to 40% by weight.

3. The animal litter according to claim 1, wherein the micronized resin includes at least one of acrylic resin, polyethylene resin, polypropylene resin, ethylene vinyl acetate copolymer resin, vinyl acetate resin, and polyvinyl alcohol resin.

4. The animal litter according to claim 1, wherein a particle diameter of the silica gel powder is 20 μm to 500 μm and a particle diameter of the micronized resin is 0.1 μm to 500 μm.

5. The animal litter according to claim 1, wherein the mass of the granular materials is spread on a floor part of an animal litter container, the floor part has a liquid passing property, the animal litter container comprises the floor part and an absorbent sheet holder positioned beneath the floor part, and an absorbent sheet is placed onto the absorbent sheet holder.

6. An animal litter comprising a plurality of granular materials, wherein each of the granular materials is made by compressing and molding a mixture of silica gel powder and micronized resin, a maximum outer diameter of each of the granular materials is 3 mm to 20 mm, and each of the granular materials is substantially cylindrical shape having a top face, a bottom face and a side face, wherein the top face and the bottom face each comprise a central portion that is cupped outward, and wherein the outer edge of each of the top face and the bottom face comprises a flat portion that borders the cupped portion,
  wherein the liquid passing ratio is 60% or more in the mass of the granular materials, measured according to steps a) to e) below:
  a) a weight A(g) of a pet toilet sheet, is measured;
  b) a cylinder with a diameter of 75 mm and a depth of 30 mm is prepared on the pet toilet sheet to fill the granular materials to a depth of 30 mm and is filled to the top with the granular materials and leveled;
  c) 20.0 g of saline solution is dripped with a funnel from a position 30 mm above the vicinity of the center of the granular materials in 10 seconds;
  d) after dripping, the granular materials and the cylinder are removed (when removing, a plastic board is placed over top of the cylinder and the cylinder and the pet toilet sheet are inverted so that unnecessary moisture transfer between the granular materials and the pet toilet sheet does not occur, and then the granular materials and the cylinder are removed); and
  e) after performing steps (a) through (d) a weight B(g) of the pet toilet sheet is measured, and the liquid passing ratio is determined using the following equation, $100 \times (B-A)/20 =$ liquid passing rate.

* * * * *